United States Patent
Sasaki et al.

(10) Patent No.: US 6,646,962 B2
(45) Date of Patent: Nov. 11, 2003

(54) APPARATUS FOR DETECTING DROPOUT, AN ERROR SIGNAL EXTRACTING UNIT, AND UNIT FOR IDENTIFYING TYPE OF DROPOUT IN AN OPTICAL PICKUP

(75) Inventors: Takashi Sasaki, Kawagoe (JP); Takashi Suzuki, Kawagoe (JP); Takao Shimamura, Kawagoe (JP); Shinya Honjou, Kawagoe (JP); Kenichi Takahashi, Kawagoe (JP); Yoshihiro Hashizuka, Kawagoe (JP); Koichi Kikuchi, Kawagoe (JP); Hideaki Yoshimura, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 382 days.

(21) Appl. No.: 09/793,729

(22) Filed: Feb. 27, 2001

(65) Prior Publication Data
US 2001/0026508 A1 Oct. 4, 2001

(30) Foreign Application Priority Data
Mar. 6, 2000 (JP) ........................... 2000-060862

(51) Int. Cl.$^7$ ................................. G11B 7/00
(52) U.S. Cl. ..................... 369/44.29; 369/44.35; 360/65
(58) Field of Search ............. 369/44.29, 44.35; 360/65

(56) References Cited

U.S. PATENT DOCUMENTS

| | | | | |
|---|---|---|---|---|
| 4,612,437 A | * | 9/1986 | Ohsato | 250/201 |
| 5,032,915 A | * | 7/1991 | Ichimura | 358/166 |
| 6,147,941 A | * | 11/2000 | Kumagai | 369/44.26 |
| 6,256,273 B1 | * | 7/2001 | Matsuda et al. | 369/44.27 |
| 6,304,400 B1 | * | 10/2001 | Schneider | 360/65 |
| 6,404,709 B1 | * | 6/2002 | Kouno | 369/44.23 |

* cited by examiner

Primary Examiner—Doris H. To
Assistant Examiner—Gautam R. Patel
(74) Attorney, Agent, or Firm—Morgan, Lewis & Bockius LLP

(57) ABSTRACT

A servo control apparatus of an optical pickup is provided for reading recorded information from a recording medium and generates a read signal. The apparatus includes an error signal extracting part for extracting an error signal which indicates a deviation amount of a reading position from a target reading position of the optical pickup; a drive part for driving the optical pickup to change the reading position; an equalizer for equalizing the error signal and supplying a drive signal which indicates a driving amount of the drive part; a detecting part for detecting a dropout portion in the read signal; an identifying part for identifying a form of the dropout portion detected in the detecting part; and a controller. The controller performs control to change a gain of the equalizer in accordance with the identified form of the dropout portion.

7 Claims, 6 Drawing Sheets

FIG. 3A
FIG. 3B
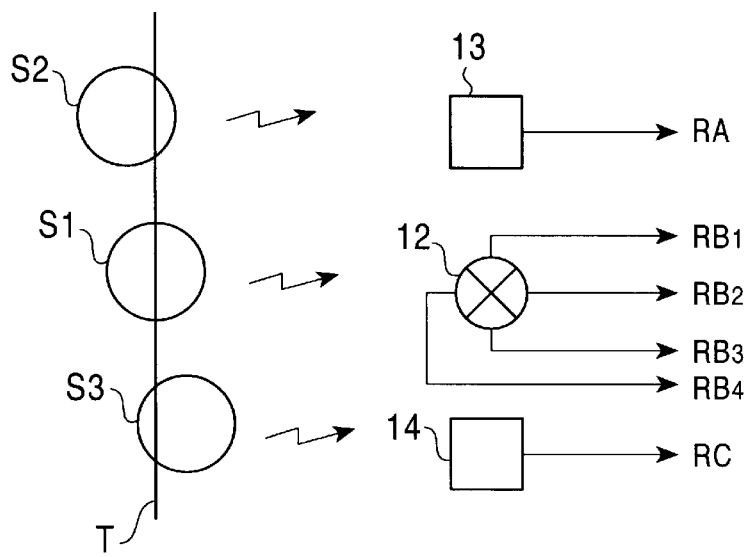
FIG. 4
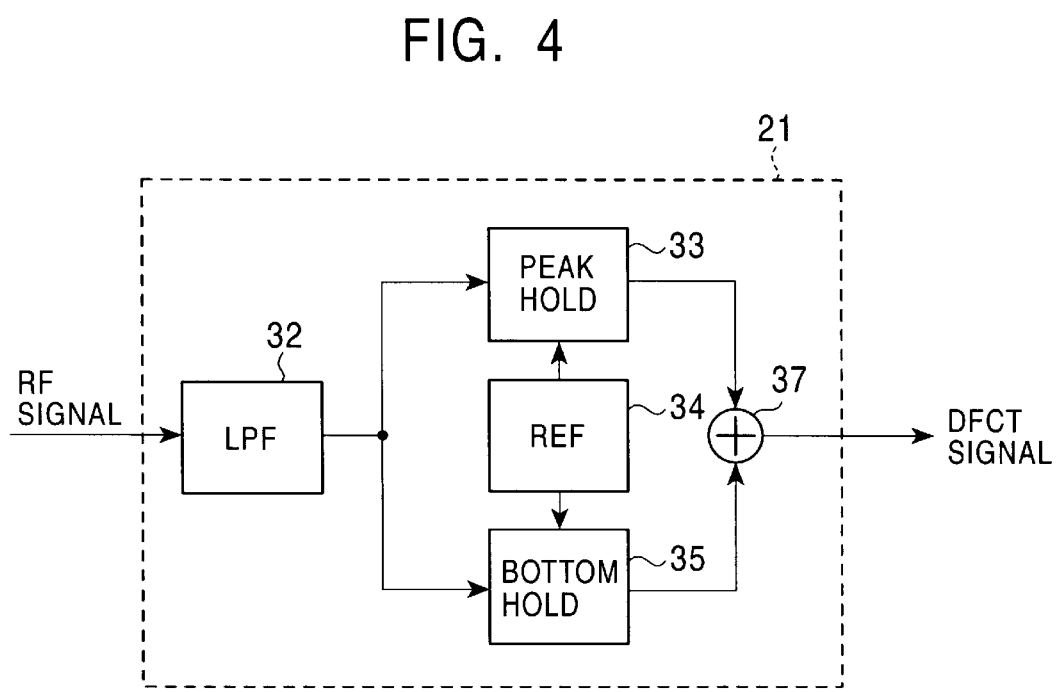

APPARATUS FOR DETECTING DROPOUT, AN ERROR SIGNAL EXTRACTING UNIT, AND UNIT FOR IDENTIFYING TYPE OF DROPOUT IN AN OPTICAL PICKUP

BACKGROUND OF THE INVENTION

1. Field of the Invention

The present invention relates to a servo control apparatus for controlling an optical pickup in an optical disc reproducing apparatus.

2. Description of the Related Art

A servomechanism which performs servo-control such as tracking-servo and focus-servo control is generally provided in a reproducing apparatus for reproducing an optical disc, for example, a CD (Compact Disc) or a DVD (Digital Versatile Disc). Reading position of the optical pickup is controlled by the servomechanism to attain an excellent reproduction performance. The optical disc usually has various defects including surface scratches, flaws, dirt or stains which are formed when the disc is manufactured, used or handled. The defects, however, impairs the stable operation of the servomechanism.

FIG. 1 is a sectional view of an optical disc 1, showing major defects occurring on the optical disc 1. The optical disc 1 has a protection layer 3, a reflection layer 4 for reflecting an optical beam emitted from an optical pickup, and a transparent cover layer 5 formed of a transparent material such as plastic.

In FIG. 1, defect I is a flaw, called an "interruption", formed on the reflection layer 4 during manufacture of the disc. Defect II is dirt, called "black dots", deposited on a disc surface, or the transparent cover layer 5. Defect II is a fingerprint or the like of human fat left on the disc surface 7, and is called a "fingerprint". Defect IV is a flaw, called a "scratch", left on the disc surface 7.

There causes a momentary loss of a read signal (RF signal) generated in the optical pickup, which is called a "dropout", when the above-described defects exist on the disc. This incurs performance degradation of servo control including tracking control, focus control and tilt control. Conventionally, the method has been employed, as a method for avoiding adverse effect upon servo control caused by such defects, that servo control is continued when detecting a defect by holding a servo-control amount (i.e., a tracking error value, a focus error value, etc.) in a value prior to the defect detection (hereinafter, simply referred to as "pre-value hold").

However, the form or shape of the dropout caused in the RF signal generated in the optical pickup differs depending on the kind or type of the foregoing defects. Therefore, it is not always preferable to use the pre-value-hold method to continue servo control for every kind of the defects. There is a problem that some kinds of defects bring about worsening in control performance or deterioration in reproduction quality.

OBJECT AND SUMMARY OF THE INVENTION

The present invention has been made from the above-described viewpoint, and it is an object of the present invention to provide a servo control apparatus capable of carrying out servo control with accuracy regardless of the kind of the defects.

To achieve the object, according to the present invention, there is provided a servo control apparatus of an optical pickup for reading recorded information from a recording medium and generates a read signal, which comprises an error signal extracting part for extracting an error signal which indicates a deviation amount of a reading position from a target reading position of the optical pickup; a drive part for driving the optical pickup to change the reading position; an equalizer for equalizing the error signal and supplying a drive signal which indicates a driving amount of the drive part; a detecting part for detecting a dropout portion in the read signal; an identifying part for identifying a form of the dropout portion detected in the detecting part; and a controller for changing a gain of the equalizer in accordance with the form of the dropout portion identified by the identifying part.

BRIEF DESCRIPTION OF THE DRAWINGS

FIGS. 3A and 3B are figures showing a positional relationship of beam spots S1–S3 with respect to a recording track (T) and a correspondence relationship between photodetectors and read signals;

FIG. 4 is a block diagram schematically showing a configuration of a defect detecting part in the servo control apparatus according to the present invention;

DETAILED DESCRIPTION OF THE INVENTION

Figure 1:
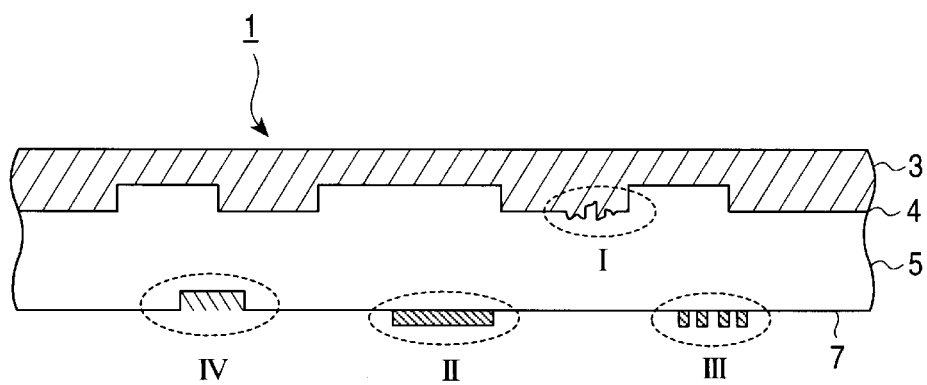
FIG. 1 is a sectional view of an optical disc showing the major defects formed on the optical disc.

Embodiments of the present invention will be described in detail with reference to the drawings. It is noted that, in the figures referred below, the substantially same constitute elements are denoted with the same reference numerals.

First Embodiment

Figure 2:
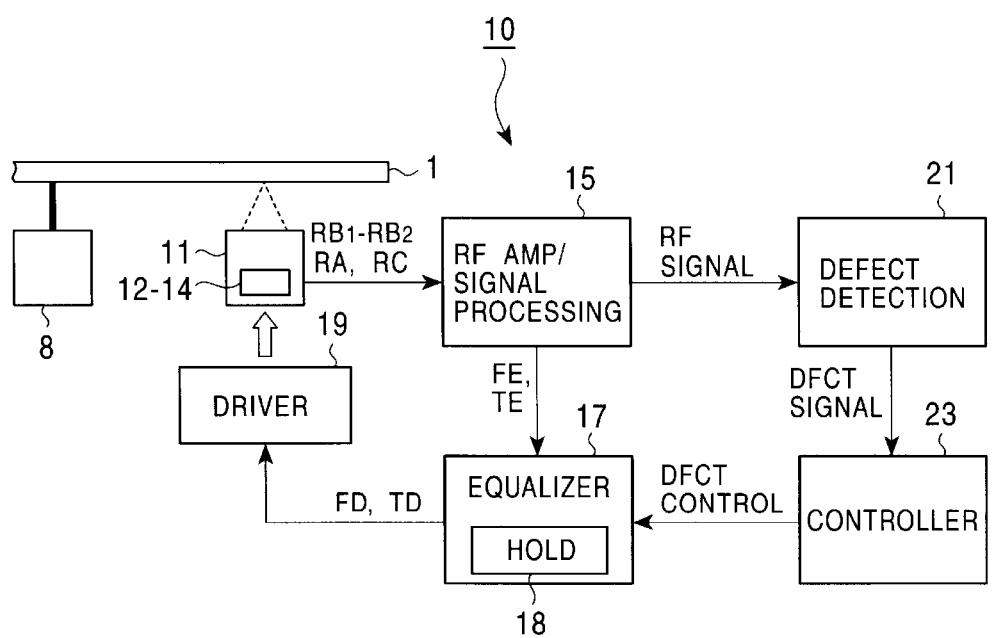
FIG. 2 is a block diagram schematically showing a configuration of a servo control apparatus for an optical disc player according to the present invention.

FIG. 2 is a figure schematically showing a configuration of a servo control apparatus 10 for an optical disc player according to the present invention.

An optical disc 1 is driven to be rotated by a spindle motor 8. An optical pickup 11 emits laser light to the optical disc 1 and receives reflection light from the optical disc 1 to generate a signal according to an amount of the received light.

As shown in FIGS. 3A and 3B, within the optical pickup 11 is provided an optical beam generator (not shown) for emitting three optical beams onto a recording surface of the optical disc 1 to form beam spots S1–S3 on a recording track T (hereinafter, simply referred to as "track"). The optical beam generator is previously arranged such that a spot center of the beam spot S1 to lie on the track and spot centers of the beam spots S2 and S3 to lie respectively in deviated positions toward the inner and outer with respect to the track.

A photodetector 12 provided in the optical pickup 11 is a four-divisional photodetector that comprises, for example, four light-receiving elements. Each of the four light-receiving elements receives reflection light of the beam spot S1 and converts the reflection light into an electric signal. The electric signals are outputted as read signals RB1–RB4. The photodetector 13 receives reflection light of the beam spot S2 and converts the reflection light into an electric signal to be outputted as a read signal RA. Similarly, a photodetector 14 receives reflection light of the beam spot S3 and converts the reflection light into an electric signal to be outputted as a read signal C. The optical pickup 11 is further provided with a tracking actuator (not shown) to move a focal position (reading position) of an objective lens (not shown) in a radial direction of the disc and a focusing actuator (not shown) to adjust the focal positions of the foregoing beam spots.

With the above-described configuration, the optical pickup 11 reads recorded information from the optical disc 1 and supplies the obtained read signals RA, RB1–RB4 and RC to a signal processing circuit 15.

There is provided an RF amplifier to amplify the read signals RA, RB1–RB4 and RC in the signal processing circuit 15. The signal processing circuit 15 then extract a tracking error signal TE and a focus error signal FE on the basis of the read signals. More specifically, the signal processing circuit 15 uses the read signals RB1–RB4 to generate as a focus error signal FE a differential signal between two addition signals obtained by adding the read signals of the light-receiving elements placed opposite to each other. The signal processing circuit 15 also generates a tracking error signal TE by a phase difference method using the read signals RB1–RB4 or a three-beam method using the read signals RA and RC. The tracking error signal TE and the focus error signal FE generated in the signal processing circuit 15 are supplied to a servo equalizer (hereinafter, referred simply to as equalizer) 17.

The equalizer 17 performs phase compensation (equalization) of the tracking error signal TE and the focus error signal FE generated in the signal processing circuit 15 into frequencies suited for servo control. The resultant signals are respectively supplied as drive signals TD and FD to a driver circuit 19 for the optical pickup 11. The equalizer 17 has a pre-value hold circuit 18 to hold the drive signals TD, FD prior to defect detection and supplies the pre-held drive signals TD, FD to the driver circuit 19 in response to an instruction by a controller 23. The driver circuit 19 generates actuator operating signals TDRV, FDRV on the basis of the drive signals TD, FD to operate the actuator in the optical pickup 11, thereby performing servo control.

Furthermore, in the present invention, there are provided a defect detecting section or a defect detecting part 21 to receive a read signal RF from the signal processing circuit 15 and detect defects formed on the optical disc 1, and a controller 23 to identify the kind of defects based on a defect detection signal detected in the defect detecting part 21 and control the equalizer 17. The controller 23 is configured by a microcomputer. The configuration and operation of the defect detecting part 21 and controller 23 will be described in detail referring to FIG. 4 to FIG. 7.

FIG. 4 schematically shows a configuration of the defect detecting part 21. An RF signal is supplied from the signal processing circuit 15 to the defect detecting part 21. As described later, defects are detected and the kinds of defects are discriminated using the RF signal.

Figure 5A:
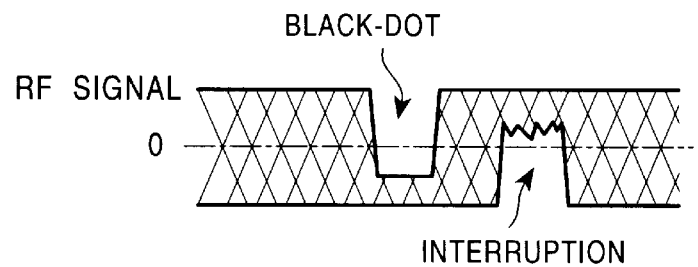
FIGS. 5A–5D are figures respectively showing an RF signal when an interruption and a black-dot are detected, a peak-hold signal and a bottom-hold signal, and a defect detection signal.

FIG. 5A shows an RF signal where interruptions (defect I) and black dots (defect II) are formed at a reading point of the optical pickup 11. The RF signal has dropouts caused due to the defects. More specifically, the RF signal at an upper level falls due to level reduction in the reflection light when a black dot is detected, whereby the RF signal is in a shape dropped out at its upper portion. On the other hand, the RF signal has a whisker-like dropout caused depending on a shape of an interruption formed in a reflection layer 4 when an interruption is detected, thus having a shape dropped out in its lower portion.

Figure 5B:
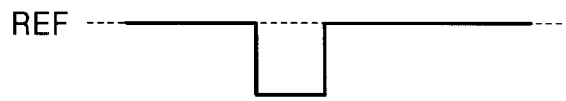
Figure 5C:
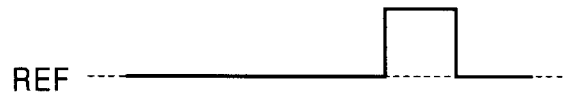
Figure 5D:
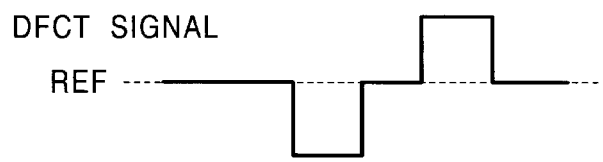

In FIG. 4, a predetermined high frequency component is removed from the RF signal in a low-pass filter (LPF) 32. The RF signal is, then, supplied to a peak-hold circuit 33 and a bottom-hold circuit 35. In the peak-hold circuit 33, a peak value of the RF signal is held and compared with a predetermined reference value (REF) which is supplied from the reference-value generating circuit 34. As a result, a signal is generated which has a concave pulse toward a minus side with respect to the reference value (REF) corresponding to the black dot as shown in FIG. 5B. Similarly, in the bottom-hold circuit 35, a bottom value of the RF signal is held and compared with a predetermined reference value (REF) supplied from the reference-value generating circuit 34. As a result, a signal is generated which has a concave pulse toward a plus side with respect to the reference value (REF) corresponding to the interruption as shown in FIG. 5C. The signals generated in the peak hold circuit 33 and the bottom hold circuit 35 are added together in an adder 37, and supplied as a defect detection signal (DFCT) to the controller 23 as shown in FIG. 5D.

Figure 6A:
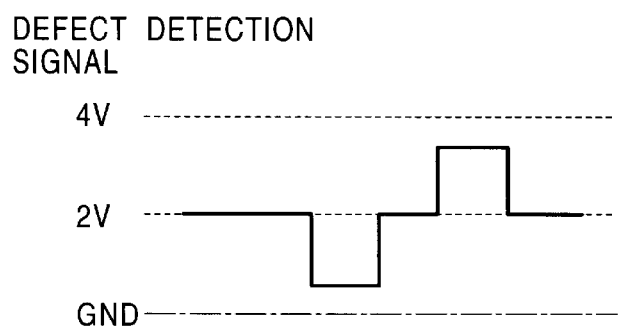
FIGS. 6A–6C are figures respectively showing a defect detection signal, a defect identification signal, and a control signal sent by a controller.
Figure 6B:
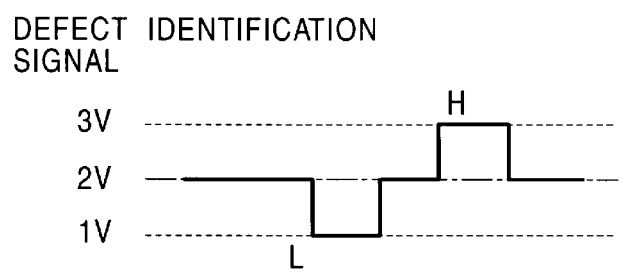

As described above, a defect detection signal is produced in accordance with a kind of a defect in the defect detecting part 21 and supplied to the controller 23. For example, description is made on an example that a defect detection signal (DFCT) having an absolute value with respect to a reference voltage (2V) is supplied to the controller 23 as shown in FIG. 6A. The controller 23 has therein a slice circuit (not shown) to slice the defect detection signals (DFCT) with a predetermined upper slice value and a predetermined lower slice value. For example, a defect identification signal as shown in FIG. 6B is produced by slicing the defect detection signal (DFCT) with using an upper slice value (3V) and a lower slice value (1V). More particularly, produced is a defect identification signal having an "L" level (1V) pulse corresponding to the black dot and an "H" level (3V) pulse corresponding to the interruption.

Figure 6C:
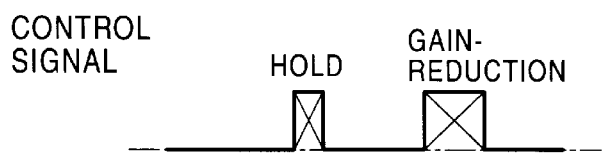

The controller 23 delivers a hold-control signal instructing to supply to the driver circuit 19 the drive signals TD, FD pre-held in the equalizer 17 corresponding to an L-level pulse of the defect identification signal as shown in FIG. 6C. In response to the hold-control signal, the equalizer 17 supplied the driver circuit 19 with the constant drive signals TD, FD pre-held prior to defect detection. At a termination of the hold-control signal or a predetermined timing, the equalizer 17 resumes servo control on the basis of the tracking error signal TE and the focus error signal FE produced in the signal processing circuit 15.

Also, the controller 23 delivers to the equalizer 17 a gain-reduction control signal to instruct reduction of a servo-control gain corresponding to an H-level pulse in the defect identification signal. In response to the gain-reduction control signal, the equalizer 17 attenuates the gain by a predetermined amount, e.g. 3 decibels (dB).

Figure 7:
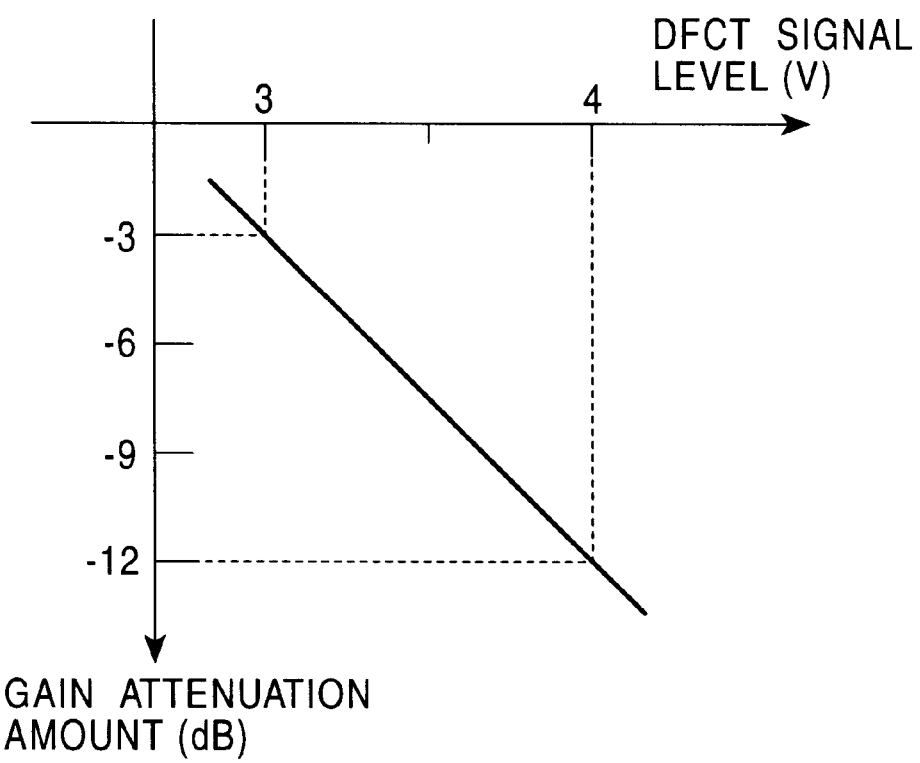
FIG. 7 is a graph showing a relationship between a level of the defect detection signal and an equalizer gain attenuation amount.

Note that the gain-reduction amount is not limited to a predetermined constant amount (3 dB in the above example). For example, by making an input port of the slice circuit as an A/D (analog/digital) port in the controller 23 for receiving the defect detection signal (DFCT), the controller 23 can determine a level of a defect detection signal (DFCT) and generates a defect identification signal dependent on the signal level to be supplied to the equalizer 17. In other words, the controller 23 may deliver a control signal designating a gain attenuation amount dependent on a level of the defect detection signal. FIG. 7 shows, in such a case, a gain attenuation amount against the defect detection signal (DFCT) level. As shown in the figure, the gain attenuation amount may be increased with increase in defect detection signal (DFCT), i.e. with increase in dropout degree.

As described above, when detecting black dots, the pre-value hold operation is made to neglect extremely weak error signals or low-reliable error signals during passing over the defects, thereby improving reproduction capability against the defects. Also, when detecting interruptions, the servo control gain is reduced. By reducing the servo-control gain against error signals having lowered reliability upon passing over the defects, reproduction capability against the defects can be improved.

Although the above description was made by exemplifying the case of the black dots and the interruptions as the defects, the invention is also applicable to the defects such as the fingerprints (defect III) and the scratches (defect IV). For example, for the scratches, control is preferably performed by holding a pre-value in a similar manner of detection of the black dots because the RF signal will have a form partly dropped out at an upper side thereof. For a case of the fingerprints, the RF signal usually has a form partly dropped out at an upper side thereof. The pre-value hold operation or gain-reduction control may be performed depending on a waveform or a magnitude of the dropouts for such a form of defects.

It should be noted that the above-described defects and the control methods for the defects are mere examples. The control methods can be selected or combined in compliance with the waveform, the magnitude and duration of dropouts occurred in the RF signal.

Second Embodiment

Figure 8:
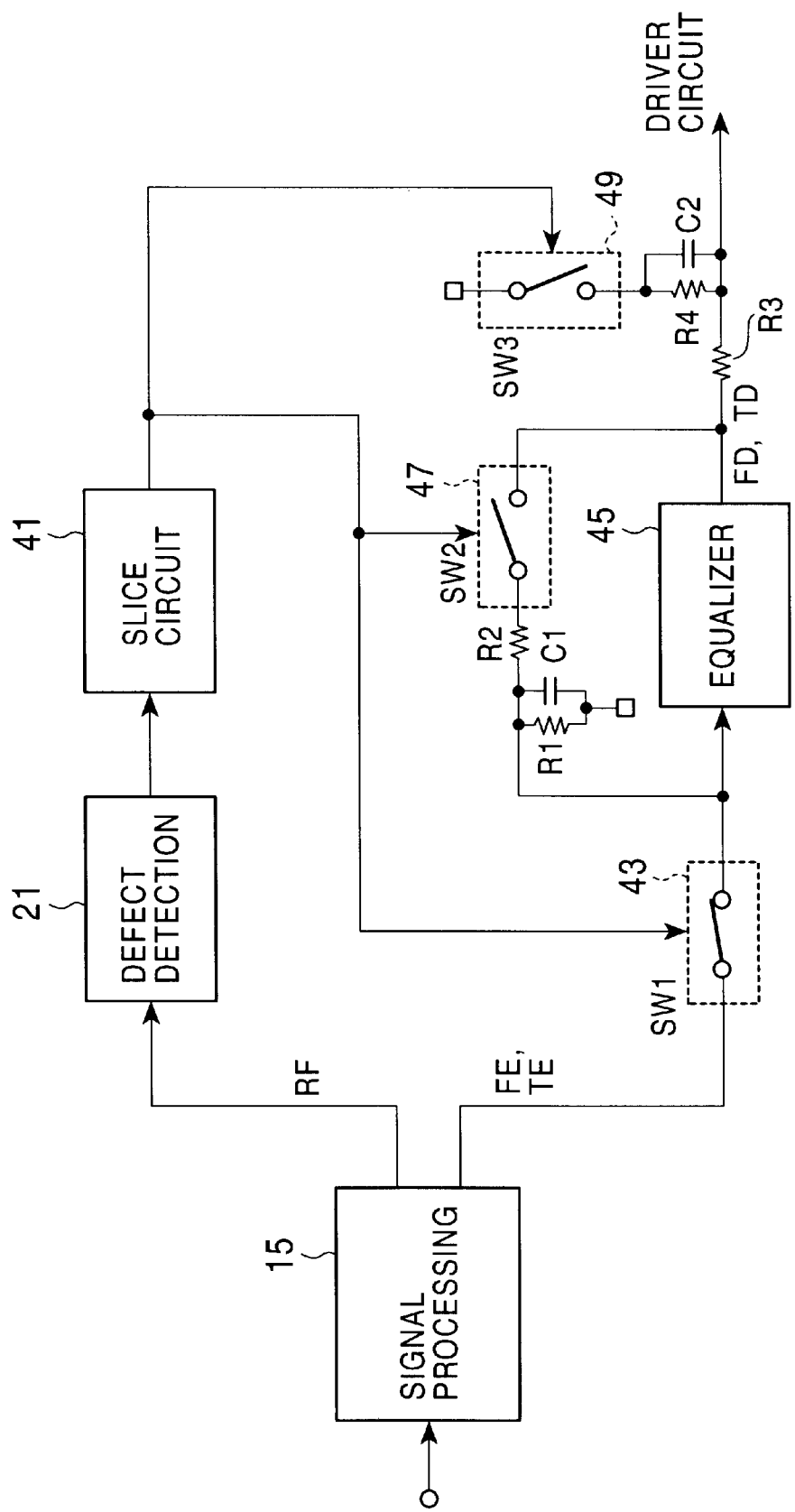
FIG. 8 is a block diagram schematically showing a configuration of a servo control apparatus according to a second embodiment of the present invention.

FIG. 8 is a block diagram schematically showing a servo control apparatus 10 according to the present invention.

Although the first embodiment was described for a case that the kind of defect was discriminated based on a defect detection signal wherein the controller 23 for controlling the equalizer 17 was configured by the microcomputer, the servo control apparatus 10 is configured with electronic circuits in the present embodiment.

Referring to the figure, a signal processing circuit 15 supplies RF signals to a defect detecting part 21. The defect detecting part 21 has the similar circuit configuration as that shown in FIG. 4, to extract a defect detection signal (DFCT) from the RF signal. The extracted defect detection signal (DFCT) is supplied to a slice circuit 41 to generate a defect identification signal similar to that of FIG. 6B.

Meanwhile, the tracking error signal TE and the focus error signal FE produced in the signal processing circuit 15 is delayed by a delay circuit (not shown) provided in the signal processing circuit 15 and then supplied to an equalizer 45 through a switch circuit 43. The switch circuit (SW1) 43 is in a conductive (i.e., closed) state during a normal servo-control operation that no defects have been detected. Also, at this time, both of a switch circuit (SW2) 47 and a switch circuit (SW3) 49 are in non-conductive (i.e., open) states.

The operation is described when a defect is detected by the defect detecting part 21. A defect identification signal is supplied from the slice circuit 41 to the switch circuit 43, the switch circuit 47 and the switch circuit 49.

The switch circuit (SW1) 43 becomes open in response to the defect identification signal of L-level supplied from the slice circuit 41 when detecting a defect such as a black dot. Note that a delay time has been set to complete the above switch operation before supplying the error signals TE and FE extracted from the read signal to the equalizer 45. The switch operation interrupts the supply of the error signals TE and FE from the signal processing circuit 15 to the equalizer 45. At this time, the switch circuit (SW2) 47 becomes closed in response to the L-level defect identification signal. The drive signals TD, FD to the driver circuit 19 for operating the optical pickup 11 is controlled to have a constant value before detecting the defect. In other words, pre-value-hold control is executed.

A capacitor C1 and resistors R1, R2 are provided in the loop circuit from an output of the equalizer 45 through the switch circuit (SW2) 47 to an input so that a direct current component of the drive signals TD, FD can be taken out to the input. The capacitor C1 and the resistors R1, R2 are set in such values that the round gain of the loop is given 0 dB. The switch circuit (SW3) 49 is configured to maintain an open state without responding to an L-level defect identification signal.

Furthermore, the switch circuit (SW1) 43 and the switch circuit (SW2) 47 respectively maintain a close state and an open state when an H-level defect identification signal is sent from the slice circuit 41 during detecting defects, such as interruptions. The error signals TE and FE are supplied to the equalizer 45 similarly to the case where no defects have been detected. On the other hand, the switch circuit (SW3) 49 enters a close state in response to the H-level defect identification signal. As shown in the figure, the equalizer 45 is provided, at its output end, with resistors R3, R4 and a capacitor C2. Therefore, the resistor R4 is connected during closure of the switch circuit (SW3) 49 thereby making it possible to attenuate the values of the drive signals TD, FD, i.e. a control-servo gain.

As described above, according to the present invention, defects are detected and the kinds of the defects are identified. Accordingly, it is possible to perform servo control in accordance with a defect form and realize a high-performance servo control apparatus having high accuracy.

It should be noted that the foregoing various embodiments are examples and can be properly combined. For example, servo control may be carried out by changing the gain attenuation amount of the equalizer according to a lapse of time or combining pre-value-hold control and gain-attenuation control, depending on a shape of dropouts, i.e. waveform, magnitude and continuing time and the like.

As apparent from the foregoing, the present invention can realize a servo control apparatus capable of carrying out servo control with high accuracy regardless of the kind of defects.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

What is claimed is:

1. A servo control apparatus of an optical pickup for reading recorded information from a recording medium and generates a read signal, the servo control apparatus comprising:

an error signal extracting part for extracting an error signal which indicates a deviation amount of a reading position from a target reading position of said optical pickup;

a drive part for driving said optical pickup to change the reading position;

an equalizer for equalizing the error signal and supplying a drive signal which indicates a driving amount of said drive part;

a detecting part for detecting a dropout portion in the read signal;

an identifying part for identifying a form of the dropout portion detected in said detecting part; and a controller for changing a gain of the equalizer in accordance with the form of the dropout portion identified by said identifying part.

2. A servo control apparatus according to claim 1, wherein said identifying part includes a hold signal generating part to extract peak and bottom values from the read signal to generate peak-hold and bottom-hold signals, thereby identifying a form of the dropout portion of the read signal on the basis of the peak-hold and bottom-hold signals.

3. A servo control apparatus according to claim 1, wherein said equalizer includes a hold part to hold the drive signal, said controller supplying to said drive part a drive signal prior to occurrence of the dropout in the read signal when the dropout portion is identified as having a predetermined form.

4. A servo control apparatus according to claim 2, wherein said equalizer includes a hold part to hold the drive signal, said controller supplying to said drive part a drive signal prior to occurrence of the dropout in the read signal when the dropout portion is identified as having a predetermined form.

5. A servo control apparatus according to claim 2, wherein said controller controls the gain of said equalizer depending on a magnitude of the peak-hold signal or the bottom hold signal.

6. A servo control apparatus according to claim 4, wherein said controller controls the gain of said equalizer depending on a magnitude of the peak-hold signal or the bottom hold signal.

7. A servo control apparatus of an optical pickup for reading recorded information from a recording medium and generates a read signal, the servo control apparatus comprising:

a signal processor for extracting an error signal which indicates a deviation amount of a reading position from a target reading position of said optical pickup;

a drive circuit for driving said optical pickup to change the reading position;

an equalizer for equalizing the error signal and supplying a drive signal which indicates a driving amount of said drive circuit;

a defect detector for detecting a dropout portion in the read signal; and a controller for identifying a form of the dropout portion detected in said defect detector to change a gain of said equalizer in accordance with the identified form of the dropout portion.

* * * * *